(12) United States Patent
Wang et al.

(10) Patent No.: US 12,500,021 B2
(45) Date of Patent: Dec. 16, 2025

(54) OPTICAL SYSTEM

(71) Applicant: TDK TAIWAN CORP., Taoyuan (TW)

(72) Inventors: Ying-Jen Wang, Taoyuan (TW); Yi-Ho Chen, Taoyuan (TW); Ya-Hsiu Wu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 491 days.

(21) Appl. No.: 17/971,867

(22) Filed: Oct. 24, 2022

(65) Prior Publication Data
US 2023/0127889 A1  Apr. 27, 2023

Related U.S. Application Data

(60) Provisional application No. 63/270,806, filed on Oct. 22, 2021.

(51) Int. Cl.
| G02B 7/04 | (2021.01) |
| G02B 7/00 | (2021.01) |
| G02B 7/02 | (2021.01) |
| G02B 7/08 | (2021.01) |
| G02B 27/64 | (2006.01) |
| G03B 9/14 | (2021.01) |
| H01F 7/08 | (2006.01) |
| H01F 7/16 | (2006.01) |
| H04N 23/51 | (2023.01) |
| H04N 23/54 | (2023.01) |
| H04N 23/55 | (2023.01) |

(52) U.S. Cl.
CPC ............. *H01F 7/081* (2013.01); *G02B 7/008* (2013.01); *G02B 7/02* (2013.01); *G02B 7/023* (2013.01); *G02B 7/04* (2013.01); *G02B 7/08* (2013.01); *G02B 27/646* (2013.01); *G03B 9/14* (2013.01); *H01F 7/16* (2013.01); *H04N 23/51* (2023.01); *H04N 23/54* (2023.01); *H04N 23/55* (2023.01)

(58) Field of Classification Search
CPC .......... G02B 7/008; G02B 7/02; G02B 7/023; G02B 7/00; G02B 7/04; G02B 7/08; G02B 27/646; G03B 2205/0061; G03B 2205/0069; G03B 2205/0076; G03B 2205/0015; G03B 9/14
USPC ................................. 359/554, 557
See application file for complete search history.

(56) References Cited

U.S. PATENT DOCUMENTS 7,578,677 B2 * 8/2009 Wu ..................... H01R 13/6582
439/67
2007/0132855 A1  6/2007  Inoue et al.
(Continued)

OTHER PUBLICATIONS

Canon Europe: "Image Stabilisation—Canon Europe", Retrieved from the Internet; Mar. 4, 2021, pp. 1-21.
(Continued)

*Primary Examiner* — Balram T Parbadia
*Assistant Examiner* — Seth D Moser
(74) *Attorney, Agent, or Firm* — MUNCY, GEISSLER, OLDS & LOWE, P.C.

(57) ABSTRACT

An optical system is provided, including an optical module, a fixed part, a movable part for holding an optical module, and a flexible member. The flexible member movably connects the movable part to the fixed part to suppress the vibration of the optical system at a first frequency.

22 Claims, 15 Drawing Sheets

(56) References Cited

U.S. PATENT DOCUMENTS

| | | | | |
|---|---|---|---|---|
| 2008/0292306 A1* | 11/2008 | Watanabe | ............. | G03B 17/14 |
| | | | | 396/448 |
| 2010/0073785 A1* | 3/2010 | Park | ...................... | H02K 5/225 |
| | | | | 310/14 |
| 2012/0120512 A1* | 5/2012 | Wade | ...................... | G02B 7/08 |
| | | | | 359/824 |
| 2014/0009607 A1* | 1/2014 | Chen | .................... | H04N 23/54 |
| | | | | 348/143 |
| 2014/0009631 A1* | 1/2014 | Topliss | ................ | H04N 23/687 |
| | | | | 348/208.11 |
| 2015/0212336 A1* | 7/2015 | Hubert | ................... | H04N 23/55 |
| | | | | 359/554 |
| 2016/0241787 A1 | 8/2016 | Sekimoto | | |
| 2016/0313568 A1 | 10/2016 | Ichihashi | | |
| 2017/0336646 A1* | 11/2017 | Miller | ..................... | G02B 7/08 |
| 2018/0335601 A1* | 11/2018 | Hu | .......................... | G03B 5/00 |
| 2019/0302576 A1* | 10/2019 | Rafalowski | ............ | B60S 1/026 |
| 2020/0033626 A1 | 1/2020 | Wu et al. | | |
| 2022/0046147 A1* | 2/2022 | Brinks | ................... | G02B 7/022 |
| 2025/0076733 A1* | 3/2025 | Yokota | .................. | H04N 23/54 |

OTHER PUBLICATIONS

European Search Report dated May 12, 2023 for the corresponding Application No. 22203194.0; pp. 1-15.

\* cited by examiner

OPTICAL SYSTEM

CROSS REFERENCE TO RELATED APPLICATIONS

This application claims the benefit of U.S. Provisional Application No. 63/270,806, filed Oct. 22, 2021, the entirety of which is incorporated by reference herein.

BACKGROUND OF THE INVENTION

Field of the Invention

The present invention relates to an optical system, and, in particular, to an optical system capable of shock absorption.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

In some electronic devices, several coils and magnets are usually used for adjusting the focus of a lens and performing the function of Optical Image Stabilization (OIS). Light can propagate through the lens to an image sensor, whereby a digital image is generated.

However, to increase the shock absorption capability of the optical system when used in vehicles can be difficult. Therefore, addressing the aforementioned problems has become a challenge.

BRIEF SUMMARY OF THE INVENTION

An embodiment of the present invention provides an optical system that includes a fixed part, a movable part for holding an optical module, and a flexible member. The flexible member connects the movable part to the fixed part for suppressing the vibration of the optical system at a first frequency.

In some embodiments, the flexible member comprises a steel cable, a spring or a combination thereof.

In some embodiments, the flexible member is disposed at a corner of the fixed part.

In some embodiments, the optical system further includes two flexible members disposed on opposite sides of the fixed part.

In some embodiments, the optical system further includes three flexible members disposed on different sides or at different corners of the fixed part.

In some embodiments, the fixed part has a quadrilateral structure, and the optical system further comprises four flexible members respectively disposed on the corners of the fixed part.

In some embodiments, the optical system further includes a circuit assembly, wherein the optical module has an optical element and an image sensing unit connected to each other, the circuit assembly is electrically connected to the image sensing unit, and the flexible member is electrically independent from the circuit assembly.

In some embodiments, the optical system further includes a circuit assembly, wherein the optical module has an optical element and an image sensing unit connected to each other, the circuit assembly is electrically connected to the image sensing unit, and the flexible member is electrically connected to the ground point of the circuit assembly.

In some embodiments, the optical system further includes a support structure affixed to the movable part and connected to the flexible member.

In some embodiments, the support structure forms a plurality of protrusions connected to the movable part.

In some embodiments, a recess is formed between the protrusions, and the flexible member is connected to the recess.

In some embodiments, the optical system further includes a spring connecting the movable part to the fixed part, wherein the spring surrounds the optical axis of the optical element.

In some embodiments, the optical system further includes a circuit assembly, wherein the optical module has an optical element and an image sensing unit connected to each other, the circuit assembly is electrically connected to the image sensing unit and extends through the spring.

In some embodiments, the optical system further includes a damper disposed between the fixed part and the movable part.

In some embodiments, the movable part has a holder, a frame, and an active damping mechanism, the holder is movably connected to the frame, and the active damping mechanism is disposed on the holder and the frame for suppressing the vibration of the optical system at a second frequency.

In some embodiments, the optical system further includes a connecting member, a plurality of clamps, and a plurality of ball elements disposed on the connecting member, wherein the clamps are respectively affixed to the holder and the frame, and the ball elements are clamped by the clamps.

In some embodiments, the optical system further includes a plurality of flexible members, wherein the fixed part has a quadrilateral structure, and the flexible members are disposed at the respective corners of the fixed part, wherein the clamps are located on different sides of the movable part, and each of the clamps is located between two of the flexible members.

In some embodiments, the active damping mechanism has a magnet disposed on the holder and a coil disposed on the frame.

In some embodiments, the active damping mechanism comprises a piezoelectric element or a shape memory alloy element connected between the holder and the frame.

In some embodiments, the optical system further includes a position sensor disposed on the holder or the frame to detect displacement between the holder and the frame.

In some embodiments, the optical system further includes a gyroscope disposed on the holder.

In some embodiments, the second frequency is less than the first frequency.

In some embodiments, the first frequency is greater than 1 Hz.

In some embodiments, the first frequency is greater than 10 Hz.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the optical system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
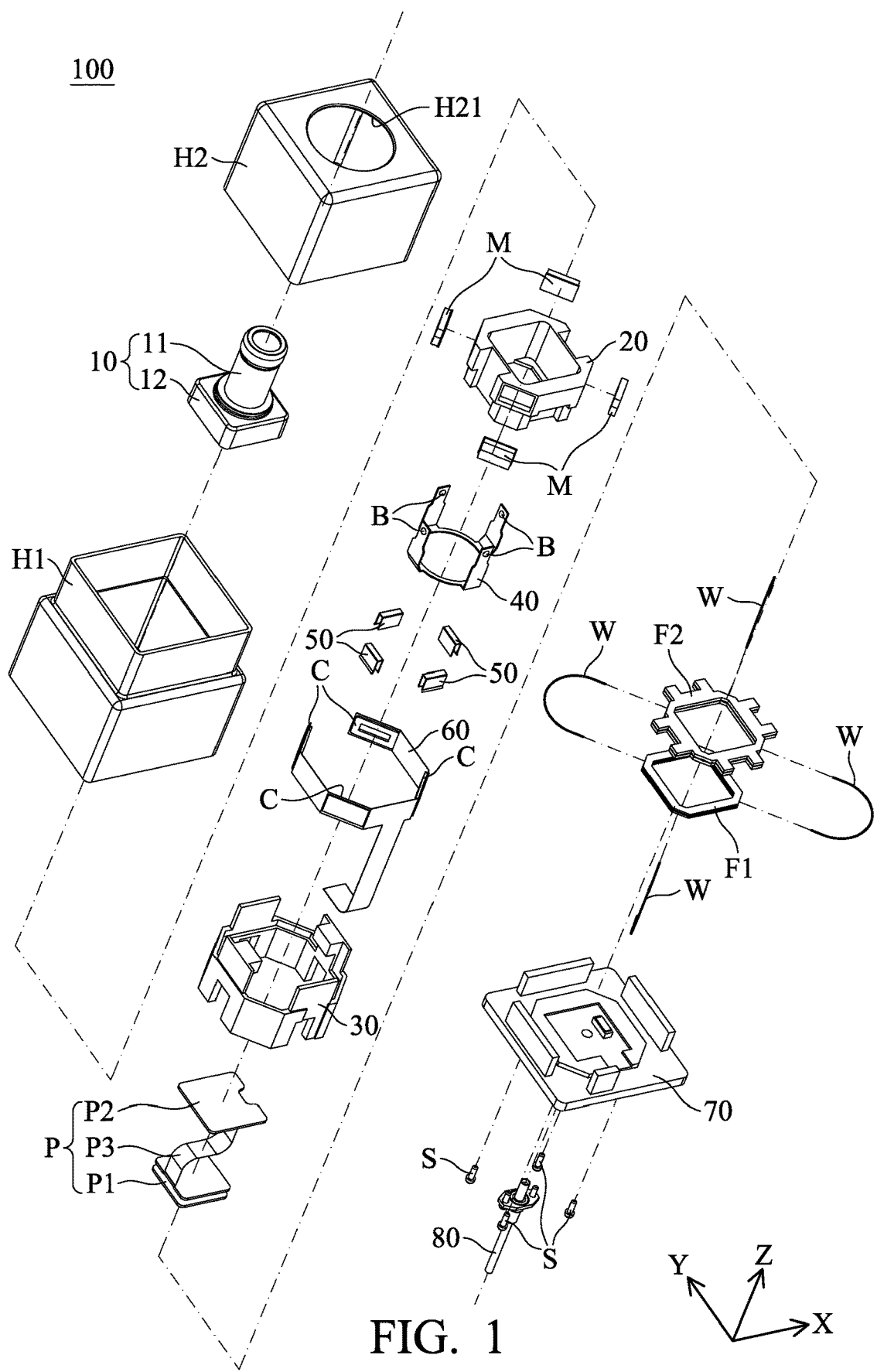
FIG. 1 is an exploded diagram of an optical system 100, in accordance with an embodiment of the invention.
Figure 2:
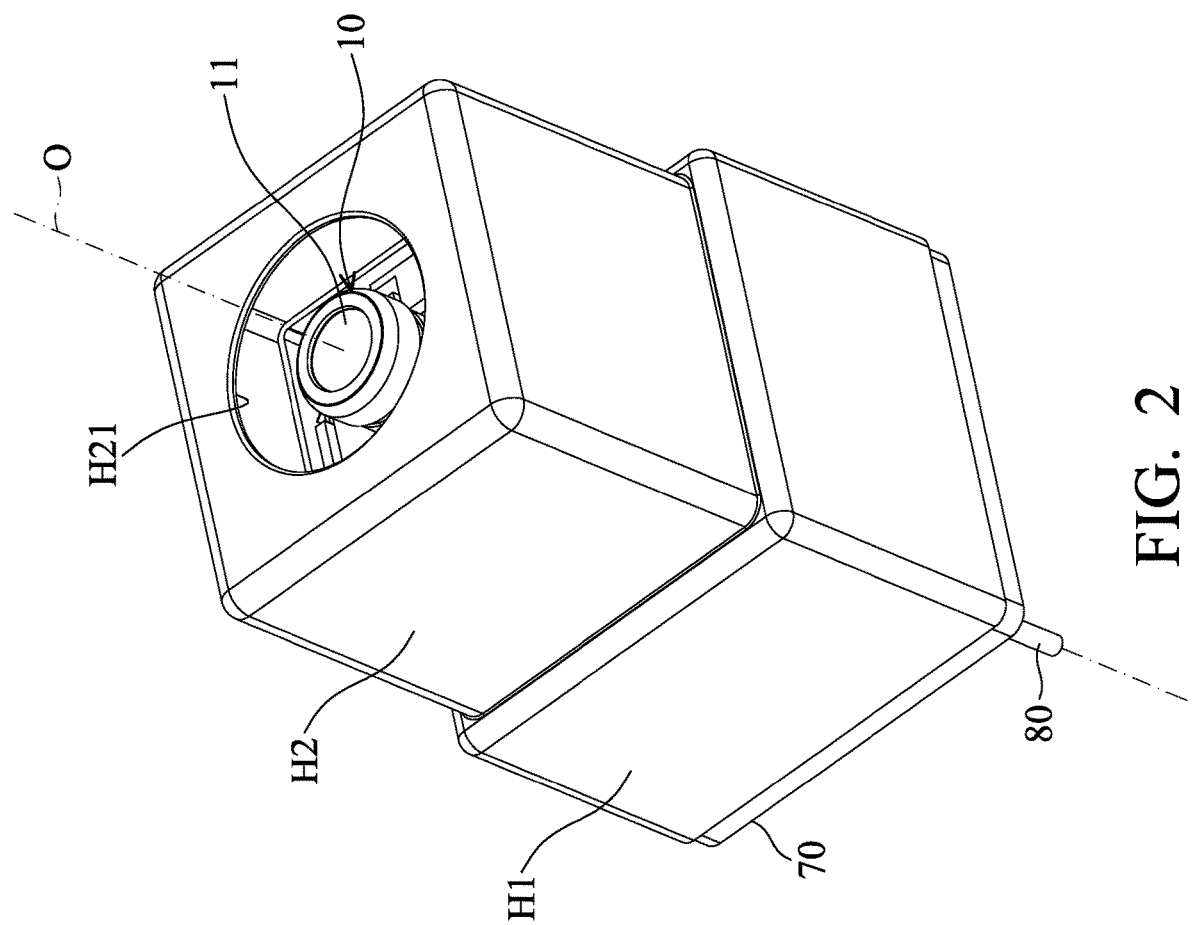
FIG. 2 is a perspective diagram of the optical system 100 in FIG. 1 after assembly.
Figure 3:
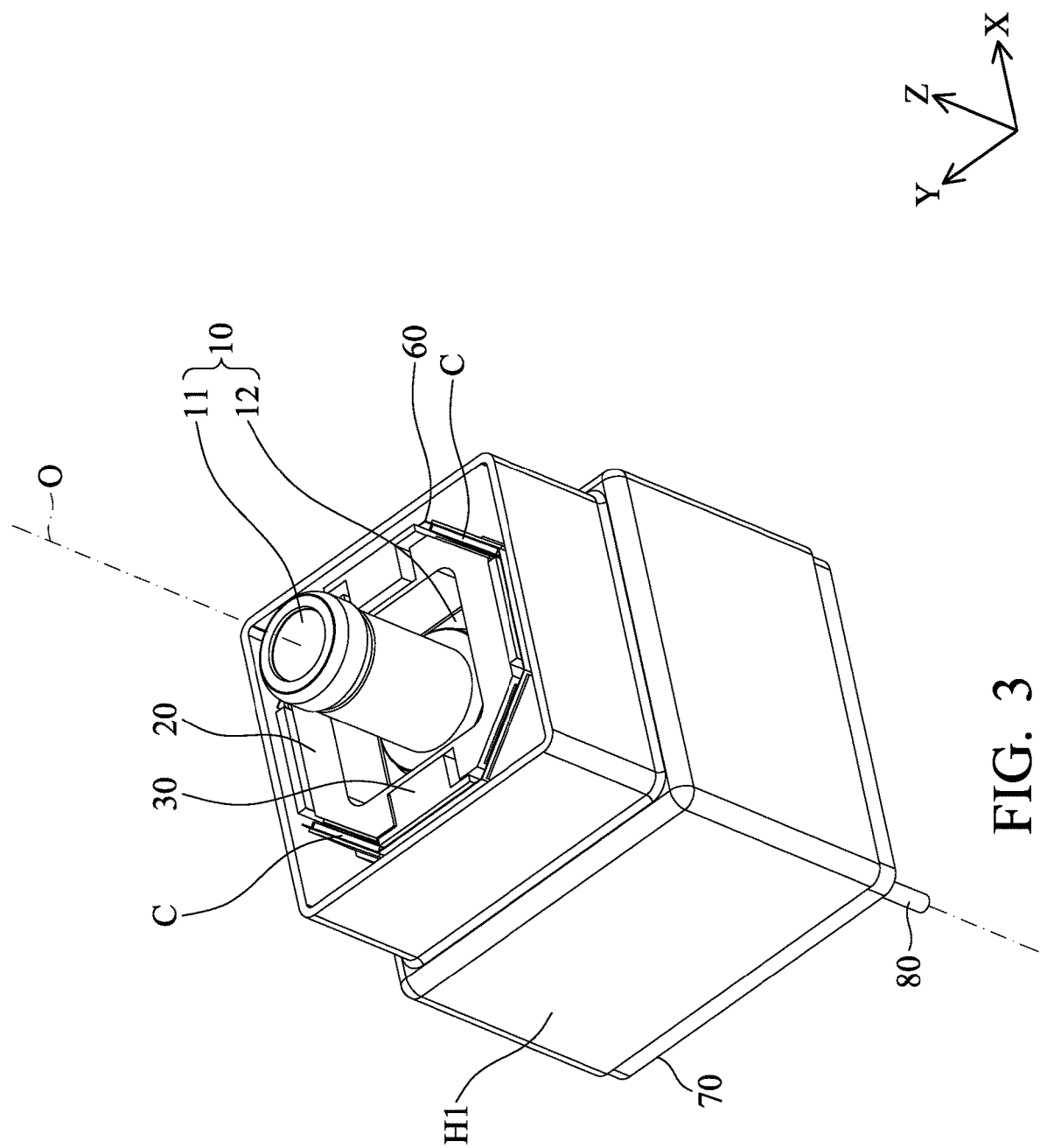
FIG. 3 is a perspective diagram of the optical system 100 in FIG. 2 when the cover H2 is omitted.
Figure 4:
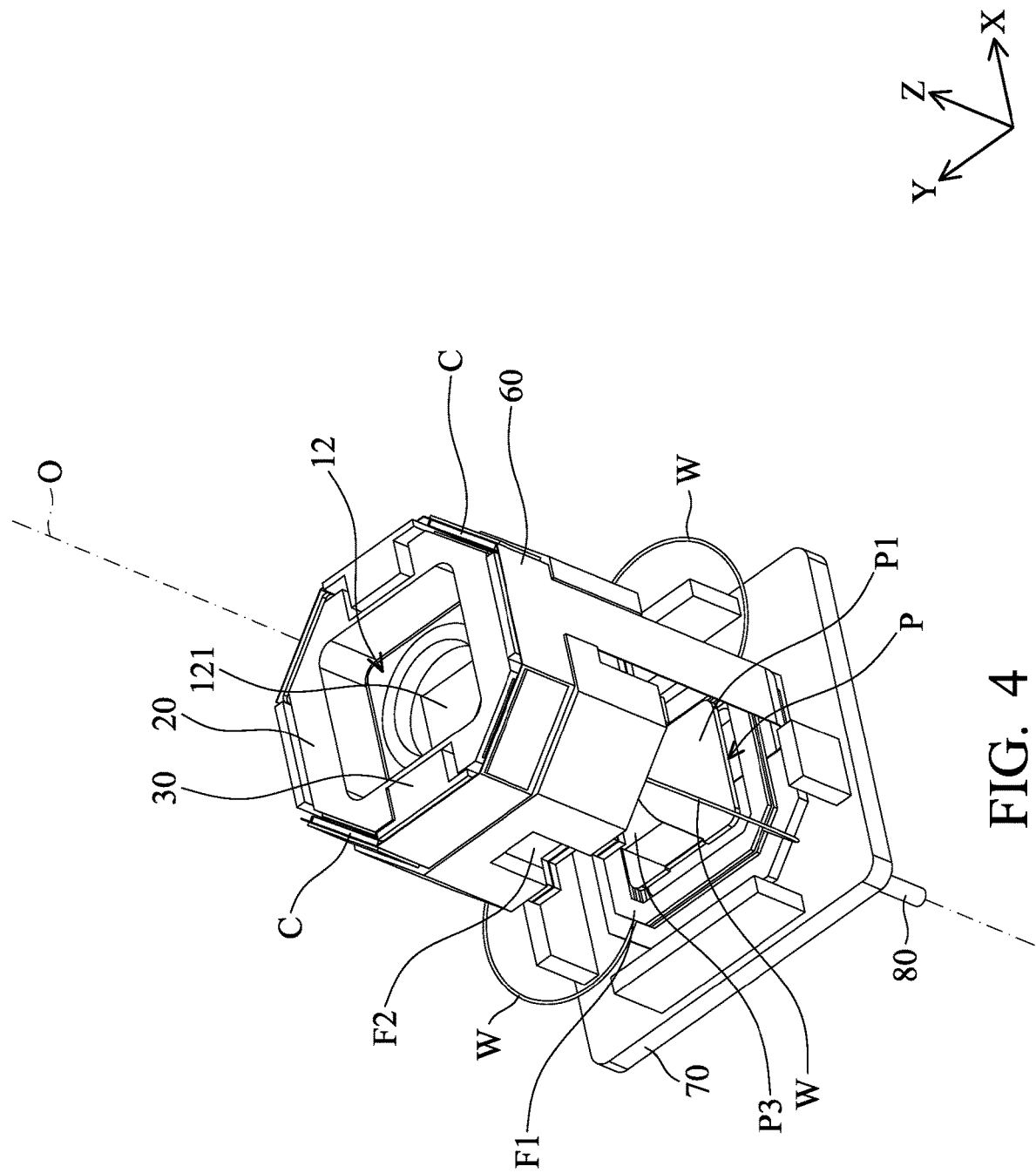
FIG. 4 is a perspective diagram of the components inside the hosing H1 of FIG. 3.
Figure 5:
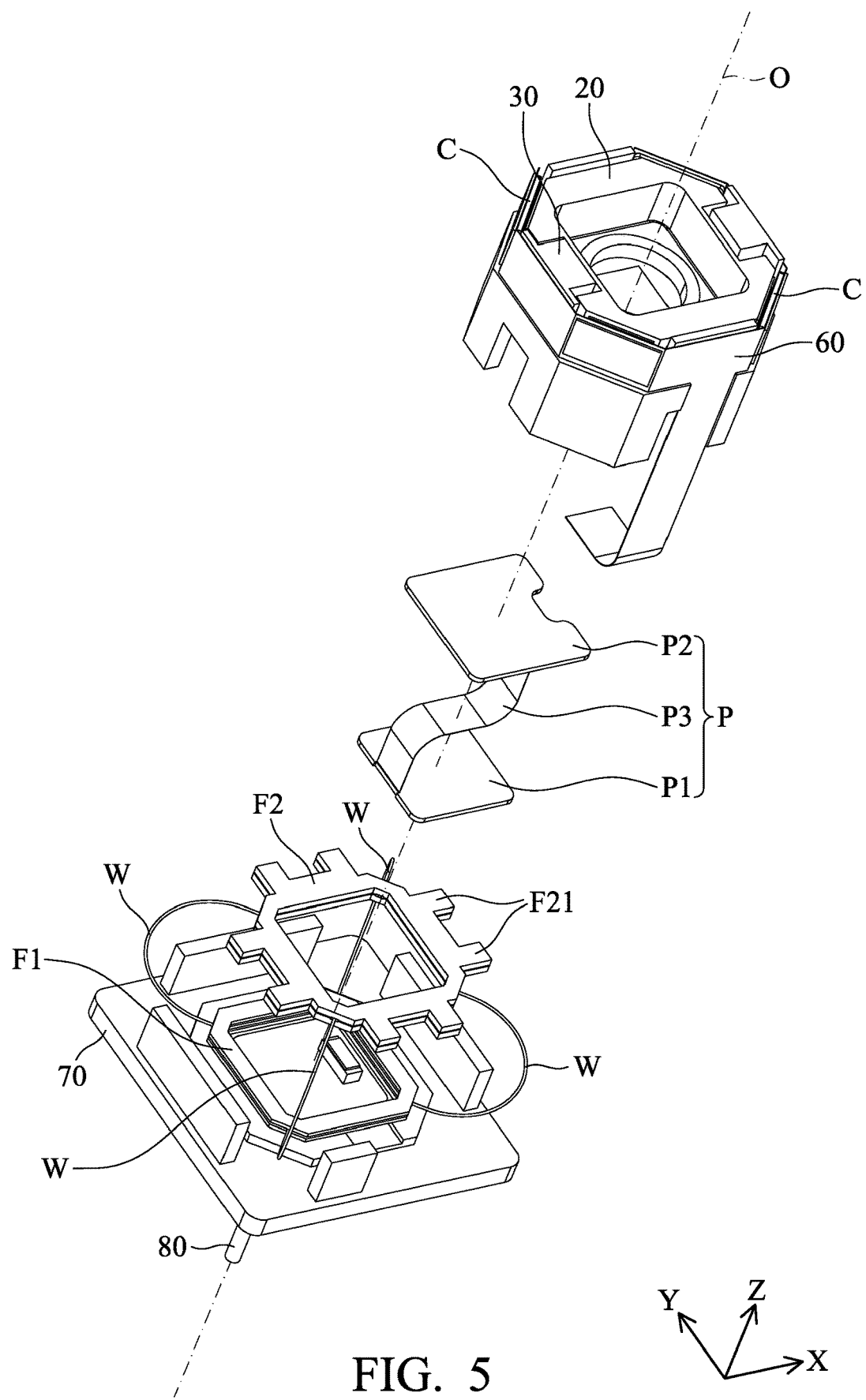
FIG. 5 is an exploded diagram of the components inside the hosing H1 of FIG. 3.
Figure 6:
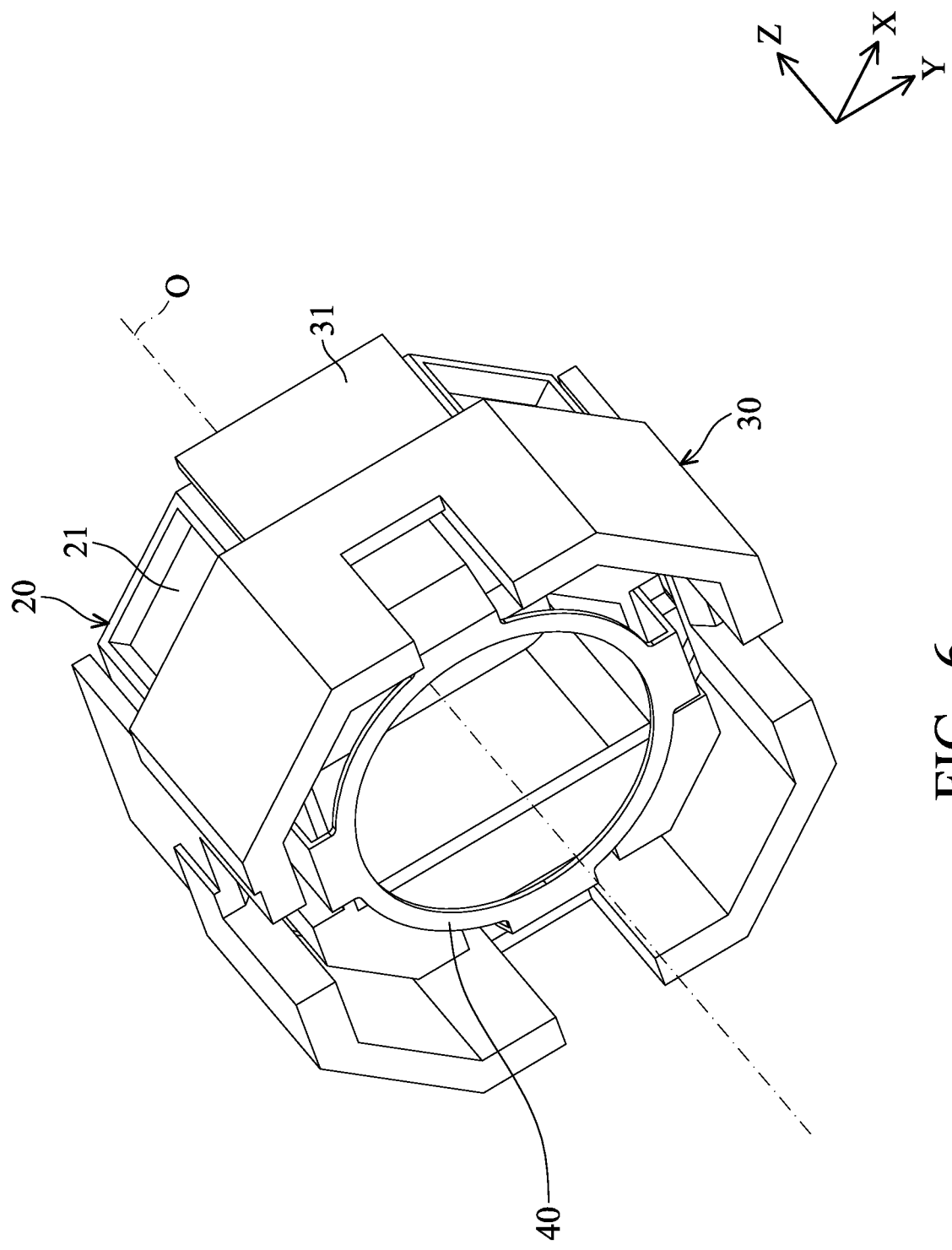
FIG. 6 is a perspective diagram of the holder 20, the frame 30, and the connecting member 40 after assembly.
Figure 7:
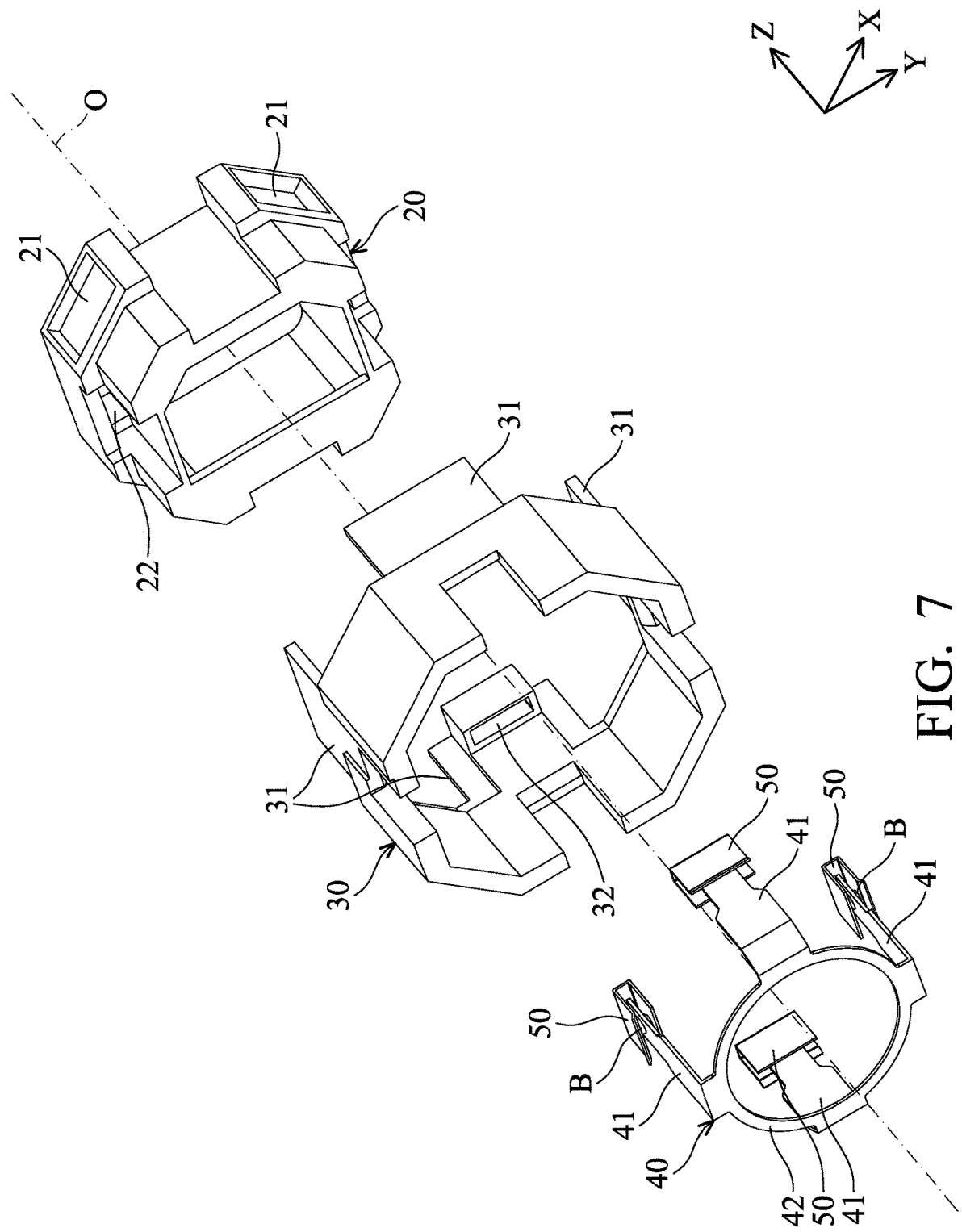
FIG. 7 is an exploded diagram of the holder 20, the frame 30, and the connecting member 40 before assembly.
Figure 8:
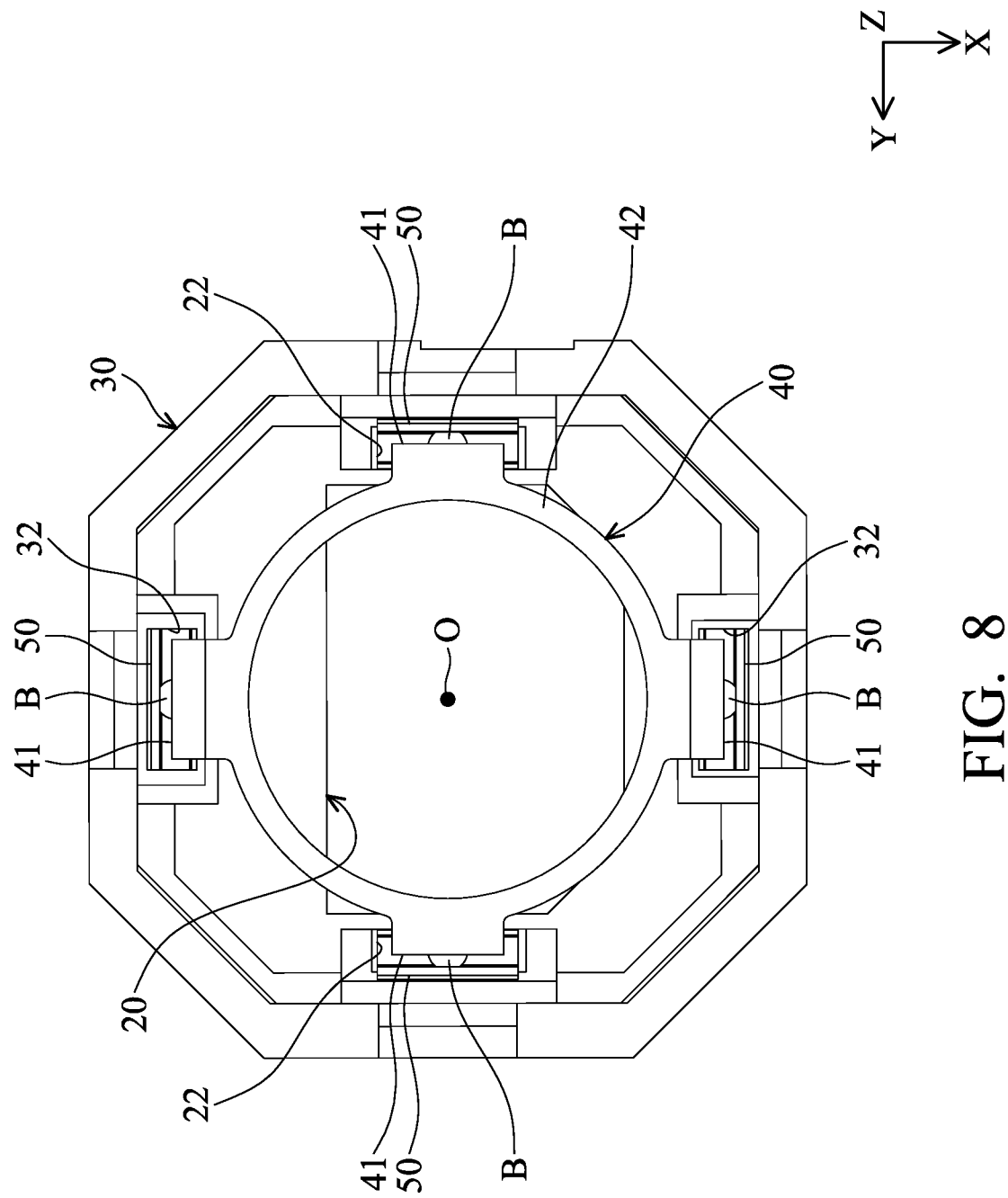
FIG. 8 is a bottom view of the connecting member 40 that has four arms 41 pivotally connecting to the holder 20 and the frame 30 via the ball elements B and the clamps 50.

FIG. 1 is an exploded diagram of an optical system 100, in accordance with an embodiment of the invention. FIG. 2 is a perspective diagram of the optical system 100 in FIG. 1 after assembly. FIG. 3 is a perspective diagram of the optical system 100 in FIG. 2 when the cover H2 is omitted. FIG. 4 is a perspective diagram of the components inside the hosing H1 of FIG. 3. FIG. 5 is an exploded diagram of the components inside the hosing H1 of FIG. 3. FIG. 6 is a perspective diagram of the holder 20, the frame 30, and the connecting member 40 after assembly. FIG. 7 is an exploded diagram of the holder 20, the frame 30, and the connecting member 40 before assembly. FIG. 8 is a bottom view of the connecting member 40 that has four arms 41 pivotally connecting to the holder 20 and the frame 30 via the ball elements B and the clamps 50.

Referring to FIGS. 1-8, the optical system 100 may be a camera device that is disposed in a vehicle. In this embodiment, the optical system 100 primarily comprises an optical module 10, a holder 20, a frame 30, a connecting member 40, a plurality of clamps 50, a circuit board 60 disposed on the outer surface of the frame 30, a base 70, a cable 80, a housing H1, a cover H2 connected to the housing H1, a plurality of magnets M, a plurality of ball elements B disposed on the connecting member 40, a plurality of coils C disposed on the circuit board 60, a circuit assembly P, a plurality of flexible members W, two support structures F1 and F2, and a plurality of fasteners S.

As shown in FIGS. 1-5, the optical module 10 has an optical element 11 (e.g. optical lens) and an image sensing unit 12 connected to each other. The image sensing unit 12 is affixed in the holder 20, and light can propagate sequentially through the opening H21 of the cover H2 and the optical element 11 to an image sensor of the image sensing unit 12, whereby a digital image can be generated.

It should be noted that the base 70, the housing H1, and the cover H2 constitute a fixed part of the optical system 100, and the holder 20 and the frame 30 constitute a movable part of the optical system 100. The movable part and the fixed part are movably connected to each other via the flexible members W, thereby suppressing the vibration of the optical system 100 owing to external forces and preventing the optical module 10 from being damaged.

In this embodiment, the holder 20 is movably received in the frame 30, the magnets M are affixed in the recesses 21 of the holder 20 (FIGS. 6 and 7), and the coils C are mounted to the circuit board 60. When the coils C are energized, an electromagnetic force can be produced to rotate the holder 20 relative to the frame 30 around the X axis or the Y axis, thereby achieving Optical Image Stabilization (OIS) of the optical system 100. For example, the circuit board 60 may be a flexible printed circuit (FPC) that surrounds the protrusions 31 of the frame 30 (FIGS. 6 and 7).

The flat support structures F1 and F2 are respectively affixed to the base 70 and the frame 30, and four flexible members W (e.g. steel cables) are connected between the two support structures F1 and F2. The circuit assembly P includes two circuit boards P1, P2 and a connecting circuit P3. The connecting circuit P3 may be a flexible printed circuit (FPC) that electrically connects the circuit board P1 to the circuit board P2.

The cable 80 is disposed at the bottom of the base 70 for electrically connecting the circuit board P1 of the circuit assembly P to a power supply or a computer. The base 70 of the optical system 100 can be mounted to a vehicle (e.g. car, motorcycle or bicycle) by the fasteners S for photographing or video recording.

As shown in FIGS. 6-8, the holder 20 and the frame 30 are movably connected to each other via the connecting member 40. The connecting member 40 has four arms 41 and a round chassis 42 connected to the four arms 41. In this embodiment, four ball elements B are disposed on the respective arms 41 and clamped in the four U-shaped clamps 50.

Still referring to FIGS. 7-8, several slots 22 and 32 are formed on the holder 20 and the frame 30 for receiving the clamps 50. In this embodiment, two arms 41 of the connecting member 40 are connected to the holder 20 via the ball elements B and the clamps 50 in the slots 22, and the other arms 41 of the connecting member 40 are connected to the frame 30 via the ball elements B and the clamps 50 in the slots 32. Hence, the holder 20 can rotate relative to the frame 30 around the X axis or the Y axis to achieve Optical Image Stabilization (OIS) of the optical system 100.

Figure 9:
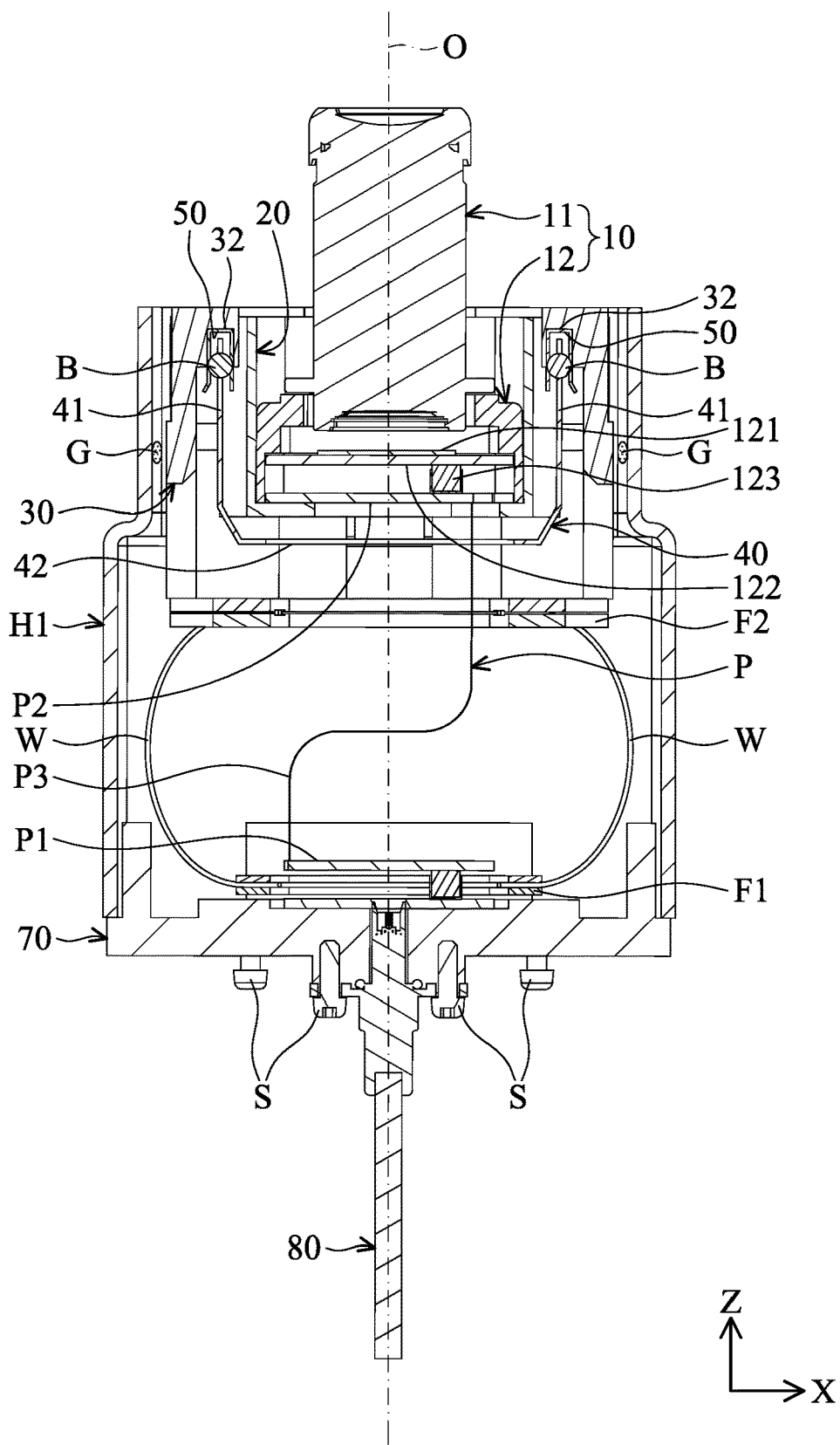
FIG. 9 is a cross-sectional view of the optical system 100 in FIG. 2 when the cover H2 is omitted.
Figure 10:
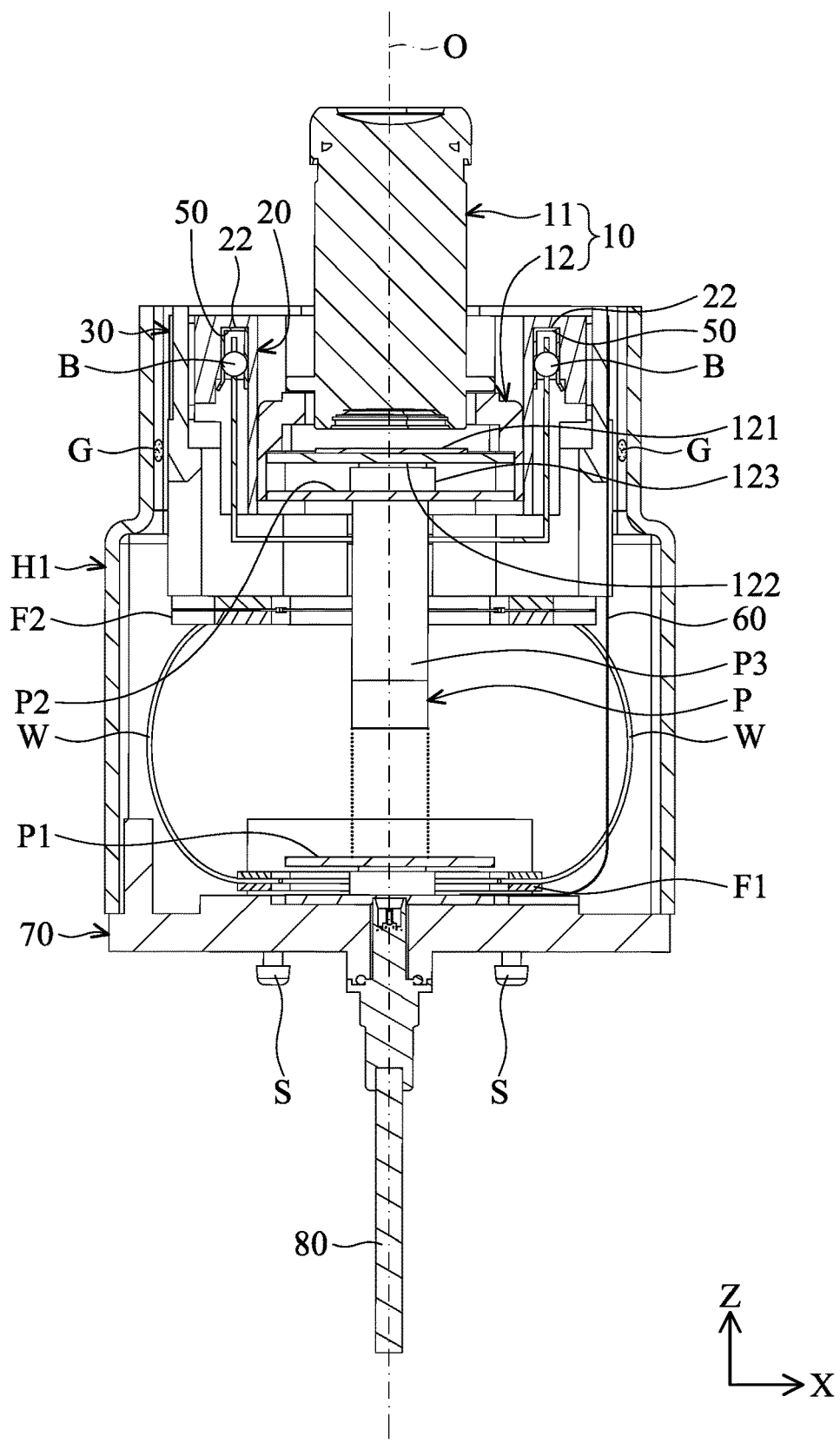
FIG. 10 is another cross-sectional view of the optical system 100 in FIG. 2 when the cover H2 is omitted.
Figure 11:
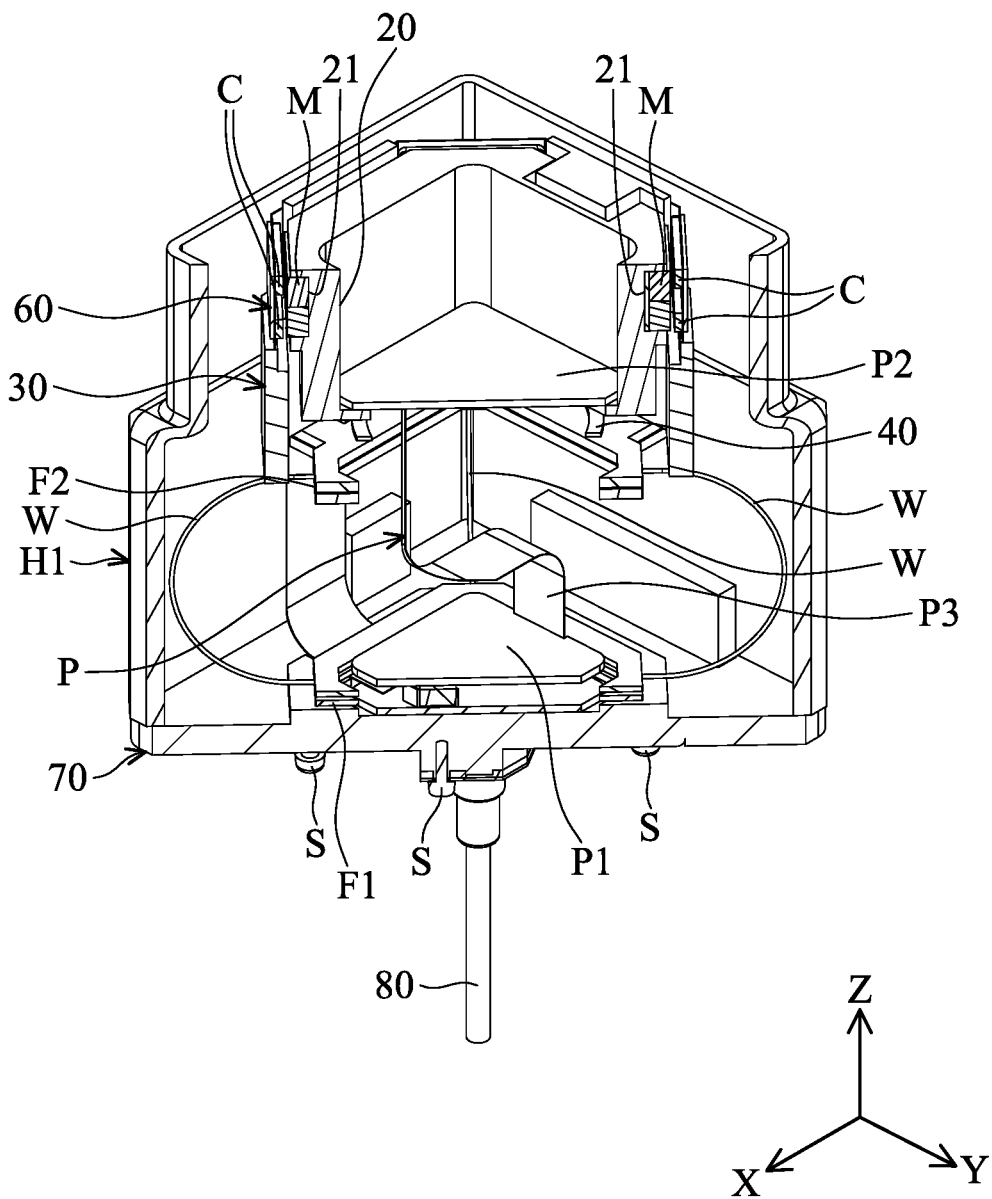
FIG. 11 is a cross-sectional view of the optical system 100 in FIG. 2 when the cover H2 and the optical module 10 are omitted.
Figure 12:
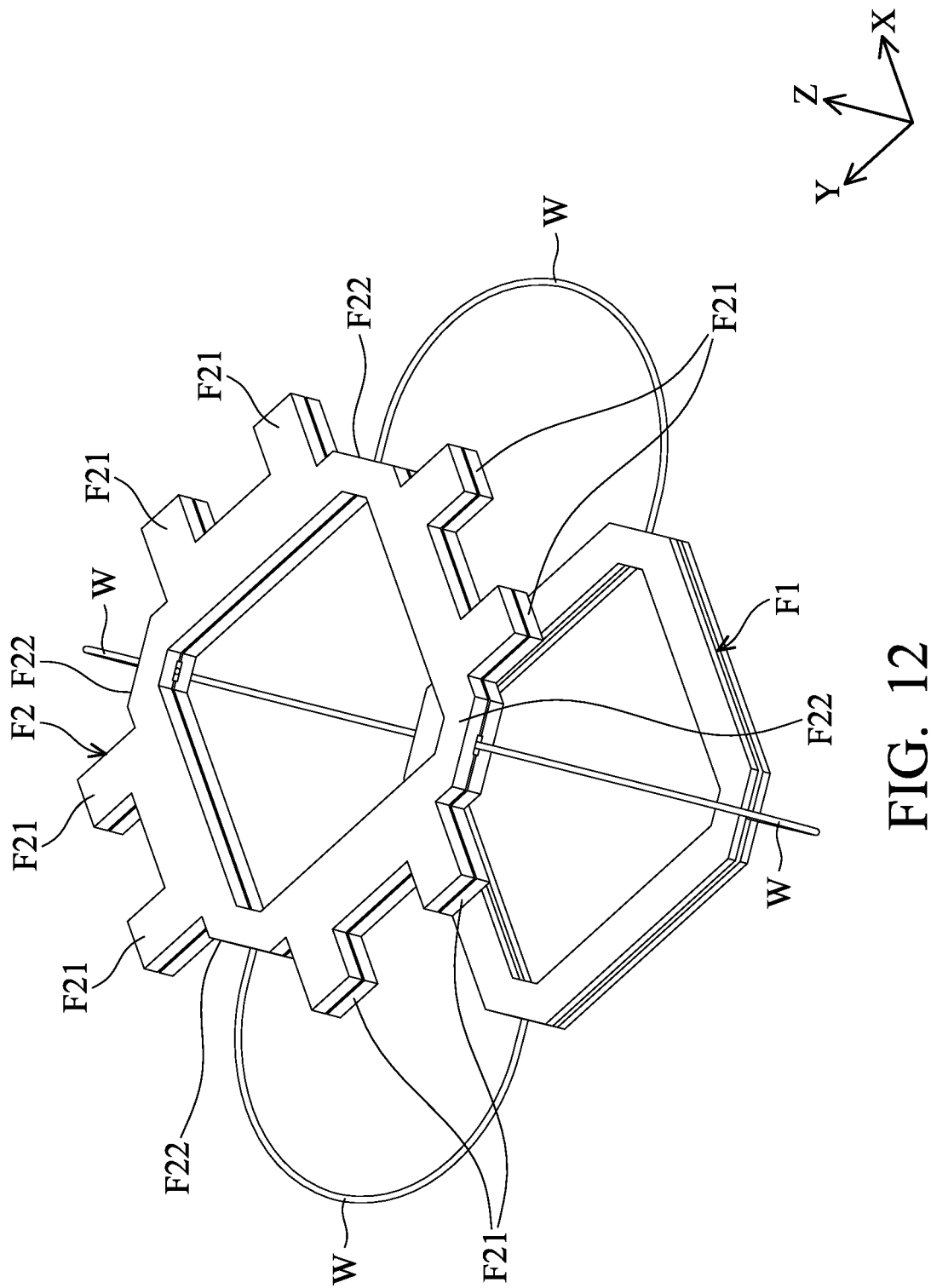
FIG. 12 is a perspective diagram of the flexible members W connected between the two support structures F1 and F2.

FIG. 9 is a cross-sectional view of the optical system 100 in FIG. 2 when the cover H2 is omitted. FIG. 10 is another cross-sectional view of the optical system 100 in FIG. 2 when the cover H2 is omitted. FIG. 11 is a cross-sectional view of the optical system 100 in FIG. 2 when the cover H2 and the optical module 10 are omitted. FIG. 12 is a perspective diagram of the flexible members W connected between the two support structures F1 and F2.

As shown in FIGS. 9-10, the image sensing unit 12 has an image sensor 121, a substrate 122, and a connector 123. The image sensor 121 is disposed on the substrate 122, and the connector 123 electrically connects the substrate 122 to the circuit board P2 of the circuit assembly P. Light can propagate through the optical element 11 to the image sensor 121 of the image sensing unit 12, thereby generating a digital image. The digital image can be transmitted to a computer via the circuit assembly P and the cable 80.

Referring to FIGS. 9-12, the two support structures F1 and F2 may comprise metal or plastic material, wherein each of the support structures F1 and F2 has two hollow and flat plates. An end of the flexible member W is clamped between the two flat plates of the support structure F1, and the other end of the flexible member W is clamped between the two flat plates of the support structure F2.

FIGS. 9-10 further shows that at least a damper G (e.g. gel) is disposed between the housing 10 and the frame 30, whereby collision between the housing 10 and the frame 30 can be avoided.

In this embodiment, the four flexible members W are disposed at the four corners of the quadrilateral base 70. In some embodiments, the optical system 100 may have only one flexible member W that is disposed at a corner of the base 70. In some embodiments, the optical system 100 may have two flexible members W disposed at two different corners or on opposite sides of the base 70. In some embodiments, the optical system 100 may have three flexible members W disposed at three different corners or on three different sides of the base 70. In some embodiments, the four flexible members W may be disposed on the four sides of the base 70.

With the flexible members W connected between the base 70 and the frame 30, the vibration of the optical system 100 at a first frequency can be efficiently suppressed, wherein the first frequency is greater than 1 Hz. Moreover, FIG. 12 shows that the support structure F2 forms several protrusions F21 affixed to the bottom of the frame 30, and at least a recess F22 is formed between two adjacent protrusions F21 and connected to the flexible member W.

Here, the flexible member W can be used as a passive damper that is not electrically connected to the circuit assembly P. However, in some embodiments, the flexible member may be electrically connected to the ground point of the circuit assembly P.

With the magnets M and the coils C disposed on the holder 20 and the frame 30, an electromagnetic force can be produced to rotate the holder 20 relative to the frame 30. In some embodiments, however, the magnets M and the coils C may be replaced by a piezoelectric element or a shape memory alloy element that is connected between the holder 20 and the frame 30 for achieving Optical Image Stabilization (OIS) of the optical system 100.

It should be noted that the magnets M and the coils C can also constitute an active damping mechanism to suppress the vibration of the optical system 100 at a second frequency, wherein the second frequency is less than the first frequency, and the first frequency is greater than 1 Hz.

In some embodiments, the first frequency may be greater than 10 Hz, and the second frequency is less than the first frequency.

As mentioned above, the optical system 100 not only comprises passive dampers (flexible members W), but also has an active damping mechanism formed by the magnets M and the coils C. Therefore, the vibration of the optical system 100 at different frequencies can be efficiently suppressed, thus improving safety and stability of the optical system 100 when used in the vehicle.

Figure 13:
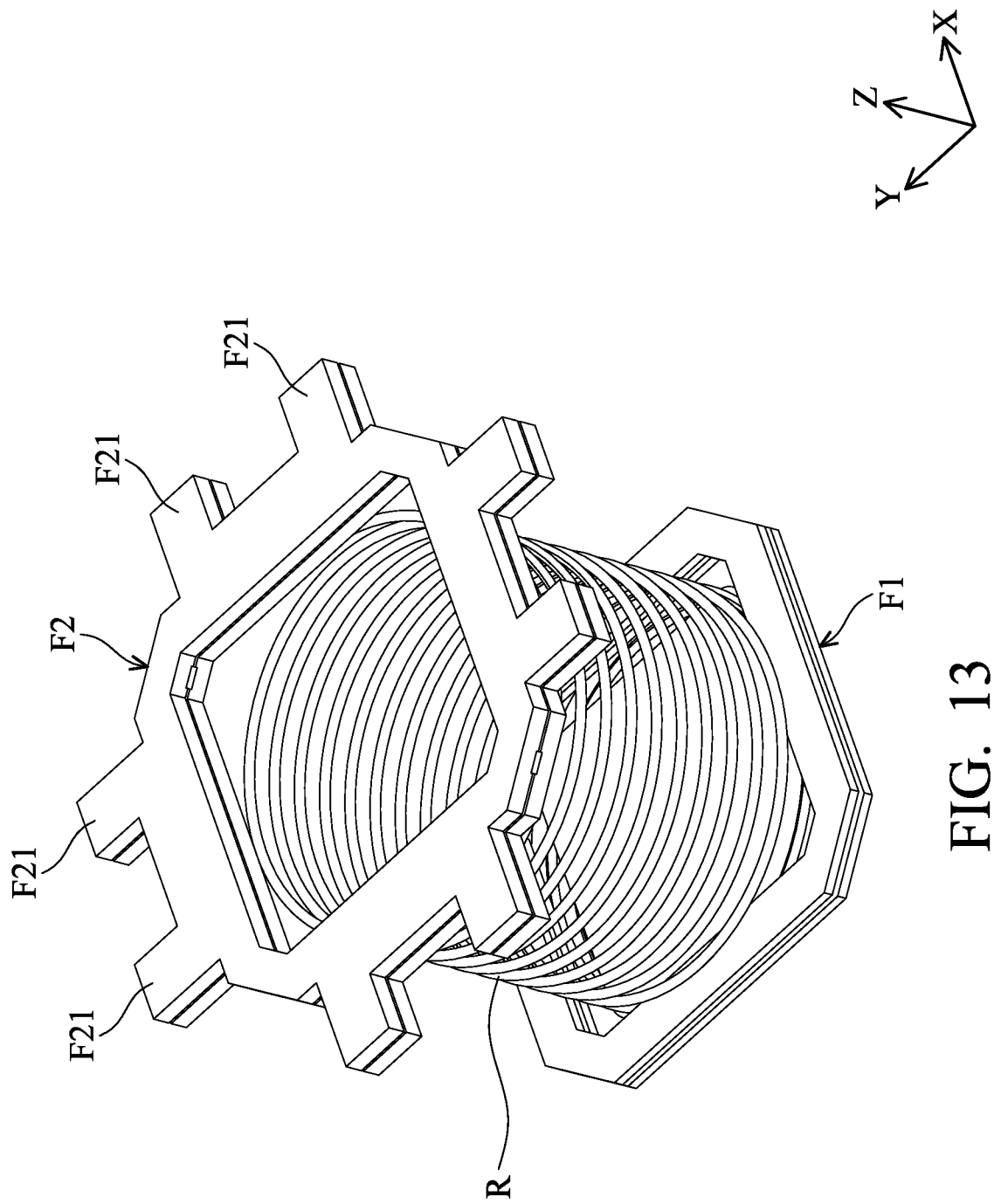
FIG. 13 is a perspective diagram of the two support structures F1 and F2 connected to each other by a spring R, in accordance with another embodiment of the invention.
Figure 14:
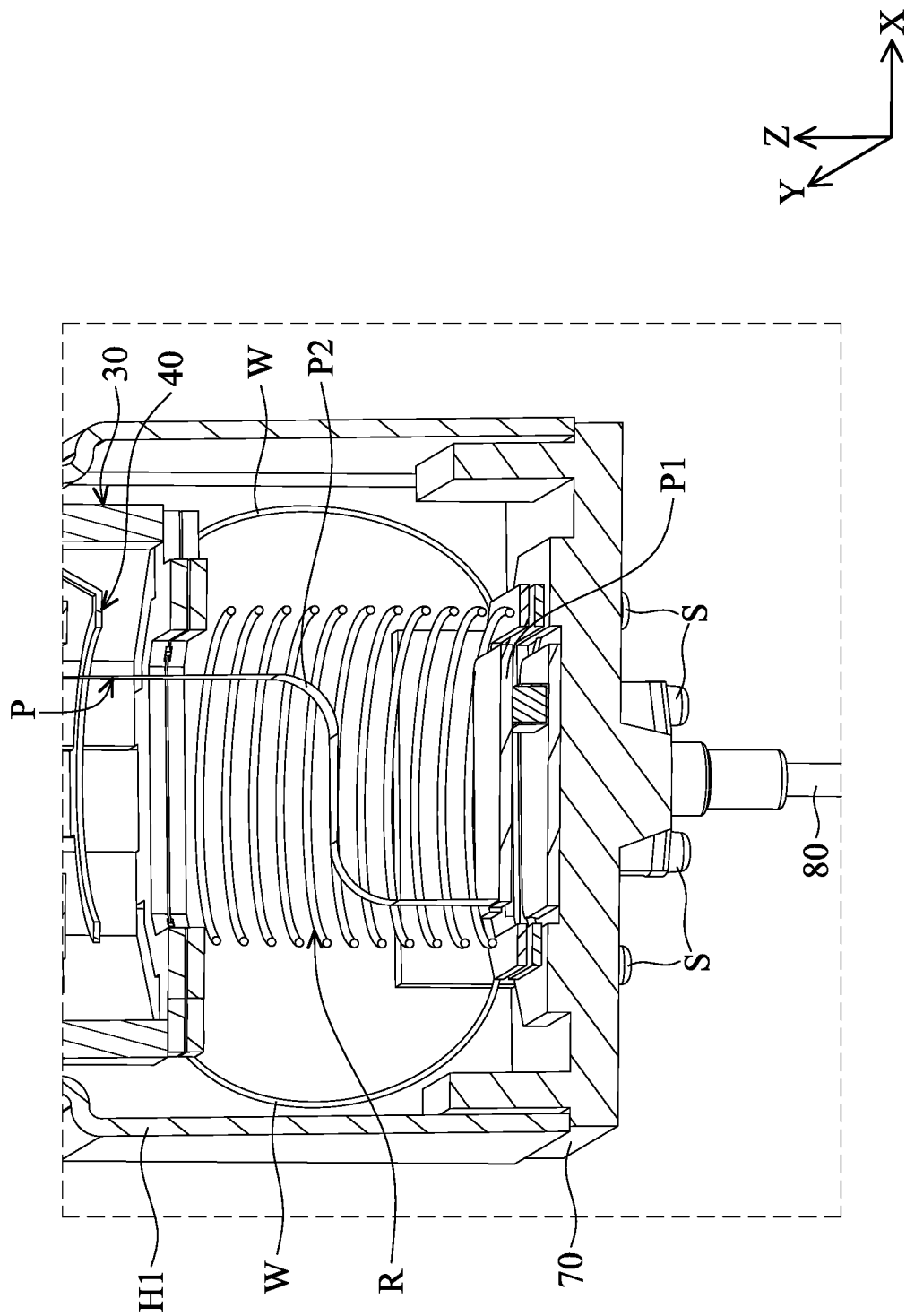
FIG. 14 is a cross-sectional view of the two support structures F1 and F2 connected to each other by the flexible members W and the spring R, in accordance with another embodiment of the invention.

FIG. 13 is a perspective diagram of the two support structures F1 and F2 connected to each other by a spring R, in accordance with another embodiment of the invention. FIG. 14 is a cross-sectional view of the two support structures F1 and F2 connected to each other by the flexible members W and the spring R, in accordance with another embodiment of the invention.

As shown in FIGS. 13-14, a spring R is connected between the two support structures F1 and F2 to increase the shock absorption capability of the optical system 100. Moreover, efficient space utilization and miniaturization of the optical system 100 can also be achieved by the circuit assembly P extending through the spring R (FIG. 14). In some embodiments, the optical system 100 may comprise only the spring R without the flexible members W.

Figure 15:
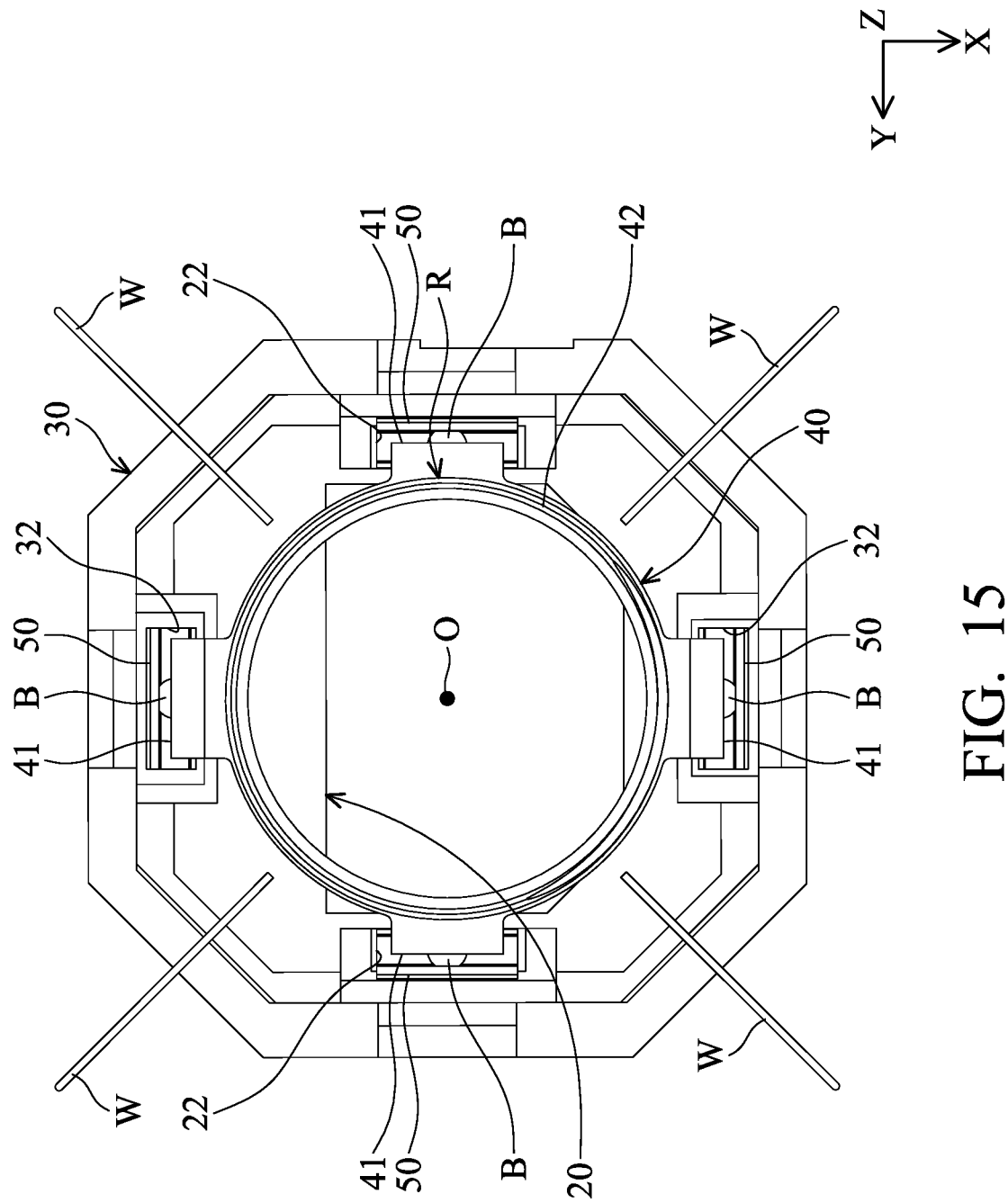
FIG. 15 is a bottom view of the ball elements B and the clamps 50 located between the flexible members W.

FIG. 15 is a bottom view of the ball elements B and the clamps 50 located between the flexible members W.

As shown in FIGS. 13-14, four ball elements B and clamps 50 are respectively disposed on the four sides of the movable part (including the holder 20 and the frame 30). Specifically, each ball element B and each clamp 50 are located between two of the flexible members W in a horizontal direction (X or Y direction). Moreover, the spring R surrounds the optical axis O, and the four ball elements B are symmetrically arranged around the optical axis O. It should be noted that the ball elements B can be used as universal joints between the holder 20 and the frame 30, thereby improving stability of the optical system 100.

In some embodiments, the optical system 100 may comprise a position sensor (e.g. Hall-effect sensor) disposed on the holder 20 or the frame 30 for detecting the displacement of the holder 20 relative to the frame 30.

In some embodiments, the optical system 100 may comprise a gyroscope (not shown) disposed on the holder 20 for detecting the motion of the optical module 10.

In summary, the invention provides an optical system 100 that includes at least a passive damper (the flexible member W and/or the spring R) and an active damping mechanism (e.g. the magnets M and the coils C). Therefore, the vibration of the optical system 100 at high and low frequencies can be both efficiently suppressed, thereby facilitating safety and stability of the optical system 100 when used in the vehicle.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical system, comprising:
   a fixed part;
   a movable part, for holding an optical module, wherein the optical module has an optical element and an image sensing unit connected to each other;
   a flexible member, connecting the movable part to the fixed part for suppressing the vibration of the optical system at a first frequency;
   a spring, connecting the movable part to the fixed part, wherein the spring surrounds an optical axis of the optical element; and
   a circuit assembly, electrically connected to the image sensing unit and extending through the spring.

2. The optical system as claimed in claim 1, wherein the flexible member comprises a steel cable, a spring or a combination thereof.

3. The optical system as claimed in claim 1, wherein the flexible member is disposed at a corner of the fixed part.

4. The optical system as claimed in claim 1, further comprising two flexible members disposed on opposite sides of the fixed part.

5. The optical system as claimed in claim 1, further comprising three flexible members disposed on different sides or at different corners of the fixed part.

6. The optical system as claimed in claim 1, wherein the fixed part has a quadrilateral structure, and the optical system further comprises four flexible members disposed on the respective corners of the fixed part.

7. The optical system as claimed in claim 1, wherein the flexible member is electrically independent from the circuit assembly.

8. The optical system as claimed in claim 1, wherein the flexible member is electrically connected to a ground point of the circuit assembly.

9. The optical system as claimed in claim 1, further comprising a support structure affixed to the movable part and connected to the flexible member.

10. The optical system as claimed in claim 9, wherein the support structure forms a plurality of protrusions connected to the movable part.

11. The optical system as claimed in claim 10, wherein a recess is formed between the protrusions, and the flexible member is connected to the recess.

12. The optical system as claimed in claim 1, further comprising a damper disposed between the fixed part and the movable part.

13. The optical system as claimed in claim 1, wherein the movable part has a holder, a frame, and an active damping mechanism, the holder is movably connected to the frame, and the active damping mechanism is disposed on the holder and the frame for suppressing the vibration of the optical system at a second frequency.

14. The optical system as claimed in claim 13, further comprising a connecting member, a plurality of clamps, and a plurality of ball elements disposed on the connecting member, wherein the clamps are respectively affixed to the holder and the frame, and the ball elements are clamped by the clamps.

15. The optical system as claimed in claim 14, further comprising a plurality of flexible members, wherein the fixed part has a quadrilateral structure, and the flexible members are respectively disposed at the corners of the fixed part, wherein the clamps are located on different sides of the movable part, and each of the clamps is located between two of the flexible members.

16. The optical system as claimed in claim 13, wherein the active damping mechanism has a magnet disposed on the holder and a coil disposed on the frame.

17. The optical system as claimed in claim 13, wherein the active damping mechanism comprises a piezoelectric element or a shape memory alloy element connected between the holder and the frame.

18. The optical system as claimed in claim 13, further comprising a position sensor disposed on the holder or the frame to detect displacement between the holder and the frame.

19. The optical system as claimed in claim 13, further comprising a gyroscope disposed on the holder.

20. The optical system as claimed in claim 13, wherein the second frequency is less than the first frequency.

21. The optical system as claimed in claim 20, wherein the first frequency is greater than 1 Hz.

22. The optical system as claimed in claim 20, wherein the first frequency is greater than 10 Hz.

* * * * *